(12) United States Patent
Polak et al.

(10) Patent No.: US 12,457,233 B2
(45) Date of Patent: Oct. 28, 2025

(54) COMMAND LINE OBFUSCATION DETECTION TECHNIQUES

(71) Applicant: Cisco Technology, Inc., San Jose, CA (US)

(72) Inventors: Michael Adam Polak, Prague (CZ); Martin Kopp, Komarov (CZ); Vojtech Outrata, Knezmost (CZ)

(73) Assignee: Cisco Technology, Inc., San Jose, CA (US)

( * ) Notice: Subject to any disclaimer, the term of this patent is extended or adjusted under 35 U.S.C. 154(b) by 188 days.

(21) Appl. No.: 18/385,591

(22) Filed: Oct. 31, 2023

(65) Prior Publication Data

US 2025/0141893 A1 May 1, 2025

(51) Int. Cl.
*H04L 9/40* (2022.01)
*G06N 20/00* (2019.01)

(52) U.S. Cl.
CPC ......... *H04L 63/1425* (2013.01); *G06N 20/00* (2019.01); *H04L 63/1416* (2013.01)

(58) Field of Classification Search
None
See application file for complete search history.

(56) References Cited

U.S. PATENT DOCUMENTS

| 10,956,477 | B1* | 3/2021 | Fang | G06F 40/30 |
| 11,620,379 | B1* | 4/2023 | Hegde | G06F 21/554 |
| | | | | 706/23 |
| 2020/0250309 | A1 | 8/2020 | Harang | |
| 2020/0327225 | A1* | 10/2020 | Nguyen | G06F 40/274 |
| 2021/0383801 | A1* | 12/2021 | Garty | G10L 15/26 |
| 2022/0156370 | A1 | 5/2022 | Yi et al. | |
| 2023/0177170 | A1 | 6/2023 | Olson et al. | |
| 2024/0095346 | A1* | 3/2024 | Cocea | G06F 40/30 |
| 2025/0004727 | A1* | 1/2025 | Rudnik | G06F 8/33 |

* cited by examiner

*Primary Examiner* — Chris Parry
*Assistant Examiner* — Abderrahmen Chouat
(74) *Attorney, Agent, or Firm* — Lee & Hayes, P.C.

(57) ABSTRACT

Techniques described herein can perform obfuscation detection on command lines used at computing devices in a network. In response to detecting obfuscation in a command line, the disclosed techniques can output a notification for use in connection with network security analysis. The command line obfuscation detection techniques include preprocessing command line input data and converting command lines into token groups. The token groups are then provided as an input to a natural language processor or other machine learned model, which is trained to identify obfuscation probabilities associated with token groups can corresponding command lines. A notification is generated to trigger further analysis in response to an obfuscation probability exceeding a threshold obfuscation probability.

20 Claims, 7 Drawing Sheets

COMMAND LINE OBFUSCATION DETECTION TECHNIQUES

TECHNICAL FIELD

The present disclosure relates generally to computer and network security, and to threat detection for the purpose of network security analysis in particular.

BACKGROUND

Security attacks are constantly finding new methods to avoid detection. One commonly used technique is obfuscation, which involves changing code or command lines to make them difficult to read without changing their functionality. There are infinite different possible combinations that can be used for obfuscation, which makes detection based on rules or signatures difficult and ineffective. Therefore, obfuscation detection techniques are needed which need not rely on detection rules or signatures.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes techniques that can be performed in connection with command line obfuscation detection. According to an example embodiment, a method can be performed by a computing device. The method can comprise obtaining command line input data via a security system. The command line input data can comprise command lines used at multiple computing devices in a computing network and logged by the security system. The command line input data can be pre-processed via at least one pre-processing operation. Any of several pre-processing operations can be used to reduce variation inside the command lines. The pre-processing can result in pre-processed command lines.

The method can further comprise generating token groups based on the pre-processed command lines. Each token group can represent a pre-processed command line of the pre-processed command lines. Furthermore, each token in a token group can represent a portion of a pre-processed command line.

The method can further comprise processing the token groups using a machine learned model. The machine learned model can be configured as a large language model. The machine learned model can generate a respective obfuscation probability for each respective token group of the token groups. In response to a respective obfuscation probability exceeding a threshold obfuscation probability, the method can include outputting an event, alert, or other notification for use in connection with security analysis of the computing network.

The techniques described herein may be performed by one or more computing devices comprising one or more processors and one or more computer-readable media storing computer-executable instructions that, when executed by the one or more processors, cause the one or more processors to perform the methods disclosed herein. The techniques described herein may also be accomplished using non-transitory computer-readable media storing computer-executable instructions that, when executed by one or more processors, perform the methods carried out by the network controller device.

EXAMPLE EMBODIMENTS

One problem in modern cybersecurity is detecting obfuscated command lines. Adversaries use obfuscation to avoid detection based on signatures, regular expressions, and simple heuristics. This disclosure proposes a framework which aims at detecting existing and novel obfuscation approaches used by emerging malware or new strains of existing malware. Furthermore, embodiments of this disclosure enable dynamic adaptation to the constantly changing threat landscape, and detection of obfuscation approaches which may be applied in the future by new types of malware.

The methods disclosed herein need not require an exhaustive list of heuristics that detect each obfuscation technique separately, as such detection approaches may have a high rate of false positives. For example, some prior obfuscation detection techniques may limit the number of "^" symbols in command lines. Such an approach can easily result in false positives because many such symbols are regularly used without any attempted obfuscation.

Some example obfuscation approaches include, e.g.: encoding code or commands (using, e.g., a Base64 or other encoding approach): adding symbols that are ignored by the command line (such as ` or ^): adding unnecessary strings into the command line that are removed in one of the execution steps: changing the case of characters in the command line at random; and changing the order of strings in the command line, wherein the strings are then re-ordered in one of the execution steps. These are just a few examples and there are many other obfuscation approaches, and new ones are continuously emerging. Embodiments of this disclosure provide a robust solution which can detect any of the above listed obfuscation approaches.

An example obfuscation detection framework according to this disclosure can process command line input data that is collected from devices in a network. In some embodiments, the command line input data can include raw data from any security product that is configured to collect command line data from network devices. The security product can collect, e.g., command line logs or power shell information from network devices.

The command line input data can be pre-processed according any, or all of the pre-processing operations disclosed herein. Data pre-processing can include, e.g., transforming internet protocol (IP) addresses and global unique identifiers (GUIDs) to reduce the noise in the data. A variety of other example pre-processing operations are disclosed herein.

Pre-processed command lines may be further processed by a tokenizer. The tokenizer can comprise a machine learned model that creates a token group for each pre-processed command line. One example tokenizer that can be adapted for use in connection with embodiments of this disclosure is the Hugging Face tokenizer framework, although any other tokenizer technologies can optionally be leveraged in other embodiments.

Token groups output by the tokenizer can be supplied as an input to a machine learned model, e.g., an NLP model or other large language model (LLM) type machine learned model. Example NLP models that can be adapted for use with embodiments of this disclosure include the Electra and Bert models, although any other NLP models can be leveraged in other embodiments. Then NLP model can be trained to determine obfuscation probabilities associated with the token groups.

The obfuscation probabilities output from the NLP model can be compared to an obfuscation probability threshold (e.g., a threshold in a range of 70%-99%). An obfuscation probability that meets or exceeds the threshold can be classified as obfuscated, and an event, alert, or other notification can be generated that includes the obfuscation verdict. The event can furthermore include data from the command line associated with the obfuscation verdict, such as the command line data, the date, time, and the network device at which the command line was logged. The event can be output for further security analysis, which can include both automated and human assisted analysis.

In an example use of the framework described above, raw command line input data can be obtained from a security product such as the Secure Endpoint product made by CISCOR®. The command line input data can comprise executed command lines, without augmentation or white space stripping, which were executed at endpoint devices in a network. An example command line is provided below; with the understanding that there are infinite variations of potential command lines:

C:/Users/username/program/something.exe3.141592-6535 https://www.example.com 127.0.0.1 2023-01-12 1234.1234.1234

Command line input data, comprising command lines such as the above example command line, can be pre-processed according to one or more pre-processing operations. Pre-processing can reduce the number of tokens that are subsequently generated during tokenization, and can also reduce the number of combinations to be learned by machine learned models used in subsequent operations, e.g., machine learned models that implement the tokenizer and the NLP model.

Embodiments of this disclosure can use any of wide variety of different pre-processing operations. Some example pre-processing operations include: replacing alphabetical characters within the command line input data with a designated replacement alphabetical character, while keeping case of the alphabetical characters, e.g., by replacing all alphabetical characters with a single character, "a", while keeping the case of the character; replacing numerical characters, e.g., all numerical characters, with designated numerical character such as a "0": replacing globally unique identifiers (GUIDs) within the command line input data with a designated GUID replacement string, e.g., by replacing all GUIDs with a specific token [GUID]: replacing dates within the command line input data with a designated date replacement string, e.g., by replacing all dates with a specific token [DATE]: replacing decimal numbers within the command line input data with a designated decimal number replacement string, e.g., by replacing all numbers (decimal) with a specific token [NUMBER]; replacing internet protocol (IP) addresses within the command line input data with a designated IP address replacement string, e.g., by replacing all IP addresses with a specific token [IP]; and replacing uniform resource locators (URLs) within the command line input data with a designated URL replacement string, e.g., by replacing all URLs with a specific token [URL].

Applying the above example pre-processing operations to the example command line set forth above can result in the below example pre-processed command line:

A:/Aaaaa/aaaa/aaaaaaa/aaaaaaaaa.aaa[NUMBER][URL] [IP][DATE][NUMBER]. [NUMBER].[NUMBER]

The above example pre-processed command line is an example result of pre-processing one command line. Command line input data can comprise multiple different command lines and so multiple corresponding pre-processed command lines can be generated, which would differ from the above example.

The pre-processed command lines can be processed by a tokenizer. The tokenizer can be responsible for splitting input strings of pre-processed command lines into respective token groups, wherein the resulting token groups are ready for processing by the following NLP model. The NLP model learns the influence of respective tokens for the purpose of assigning obfuscation probabilities.

In some embodiments, a tokenizer can comprise a trained machine learning model. For example, a WordPiece type method can be used to train a tokenizer machine learning model, in order to produce a tokenizer that can used in accordance with embodiments of this disclosure. In general, a tokenizer can be trained on a data distribution of multiple pre-processed command lines and can learn which portions of pre-processed command lines to convert into tokens, based on a frequency analysis of command line portions or sub-tokens in the data.

In an example, the below pre-processed command line can be provided as an input to a tokenizer:

A:/Aaaaa/aaaa/aaaaaaa/aaaaaaaaa.aaa[NUMBER][URL] [IP][DATE]0000.0000.0000

The above example pre-processed command line can be processed by the tokenizer, resulting in the below example token group output:

['[CLS]','A',':','/','A','aaaa','/','aaaa','/','aaaaaaa','/', 'aaaaaaaaa','##.aaa',' ', '[NUMBER]',' ','[URL]',' ',' [IP]',' ','[DATE]',' ','[NUMBER]',' ','[NUMBER]','.',   '[NUMBER]','[SEP]','[PAD]','[PAD]',' [PAD]','[PAD]','[PAD]','[PAD]']

In the above token group, the [CLS] and [SEP] tokens mark the start and end of the command line, respectively. Furthermore, the token group is also padded meet a uniform target token group length, using the [PAD] token.

The above example token group is an example result of processing one pre-processed command line with a tokenizer. Tokenizers can process multiple different pre-processed command lines, resulting in multiple different token groups, which would differ from the above example.

The token groups output by the tokenizer can optionally be encoded and can be supplied as inputs for processing by a machine learned model. In one example, the machine learned model can comprise an NLP model adapted to process ONE-HOT encoded token groups. In another example, the machine learned model can comprise an Electra model from the LLM family implemented by the HuggingFace library. The NLP model can be adapted to assess the probability of a command line (represented by a token group) being obfuscated. The output of the NLP model can comprise obfuscation probabilities associated with command lines.

A threshold obfuscation probability, e.g., a threshold obfuscation probability in the range of 70%-99%, can be used to classify output obfuscation probabilities as either obfuscated or not obfuscated. Command lines associated with an "obfuscated" verdict can be identified in an event, alert, or other notification which can be further analyzed in connection with security analysis of the network.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
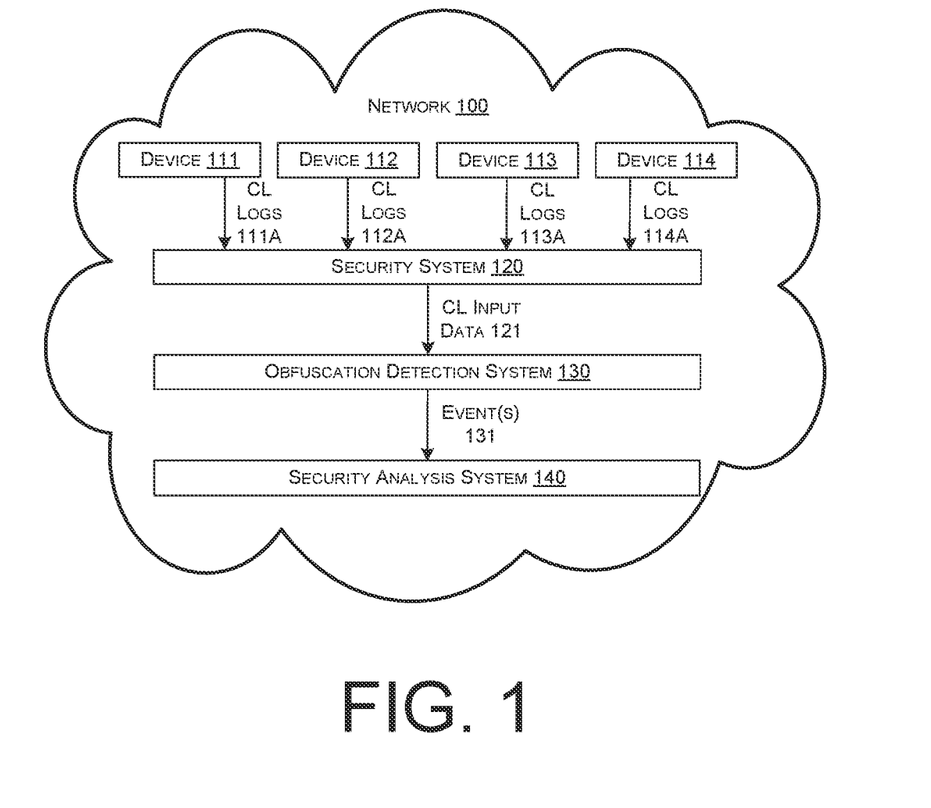
FIG. 1 illustrates an example network configured with an obfuscation detection system, in accordance with various aspects of the technologies disclosed herein.

FIG. 1 illustrates an example network 100 configured with an obfuscation detection system 130, in accordance with various aspects of the technologies disclosed herein. The example network 100 includes example devices 111, 112, 113, and 114, a security system 120, the obfuscation detection system 130, and a security analysis system 140.

The example devices 111-114 can be any network devices, including endpoint devices, servers, routers, laptops, personal computers (PCs), mobile devices, or other devices. The security system 120 can comprise a system that monitors operations at the devices 111-114 and collects data for use in security analysis. For example, in some embodiments, the security system 120 can comprise a Secure Endpoint product made by CISCO®.

The security system 120 can be adapted to aggregate command line input data from the devices 111-114. For example, command lines executed at the devices 111-114 can be stored in command line logs, and the security system 120 can be configured to obtain the command line logs from the devices 111-114. In FIG. 1, the security system 120 obtains command line logs 111A from device 111, the security system 120 obtains command line logs 112A from device 112, the security system 120 obtains command line logs 113A from device 113, and the security system 120 obtains command line logs 114A from device 114.

The command line logs 111A-114A can comprise command lines executed at a device 111-114, e.g., command lines executed during a time interval beginning at a previous command line log collection and ending at a current time of collection. In some embodiments, the command line logs 111A-114A can further comprise, e.g., an identification of the device 111-114 that executed the command line, an identification of a date and time of execution, an identification of a user of the device 111-114 at the time of execution, identifications of software and/or processes running at the device 111-114 at the time of execution, an identification of a user or process that entered the command line, and any other data pertaining to conditions or circumstances associated with an executed command line. The security system 120 may be configured to continuously collect command line logs from the devices 111-114, or the security system 120 can be configured to collect command line logs from the devices 111-114 according to a collection schedule that can optionally be synchronized with periodic operations of the obfuscation detection system 130.

The obfuscation detection system 130 can be configured to obtain command line input data 121 from the security system 120. The command line input data 121 can comprise, e.g., the aggregated command line logs 111A-114A. The obfuscation detection system 130 can be configured to obtain command line input data 121 continuously or periodically, and collection can optionally be synchronized with other operations of the obfuscation detection system 130. Alternatively, the obfuscation detection system 130 can be configured to collect command line input data 121 according to a first timing, e.g., a timing set by the security system 120, while obfuscation detection operations of the obfuscation detection system 130 can be performed according to a second timing. The second timing can be periodic or as needed, e.g., performed after a desired target number of command lines are available for processing by the obfuscation detection system 130.

The obfuscation detection system 130 can be configured to process each command line in the command line input data 121 in order to determine obfuscation probabilities associated with the command lines. The obfuscation detection system 130 can furthermore compare the determined obfuscation probabilities with an (optionally configurable) threshold probability, and the obfuscation detection system 130 can generate event(s) 131 for obfuscation probabilities that exceed the threshold probability. While event(s) 131 are illustrated in FIG. 1 and are generally used as an example in this disclosure, the obfuscation detection system 130 can generate alerts or other notifications in some embodiments. The term "notification" will be used herein to refer generically to events, alerts and other notifications. The event(s) 131 can each identify a command line associated with a high obfuscation probability, along with data pertaining to conditions or circumstances associated with the command line, such as the user/device identification, date and time, and other command line circumstance data described herein. Example operations of the obfuscation detection system 130 are described further in connection with FIGS. 2-5.

The event(s) 131 can be output from the obfuscation detection system 130 toward the security analysis system 140. The security analysis system 140 can comprise an automated or partially automated system configured to identify, prioritize, and facilitate analysis of potential security threats to the network 100. For example, the security analysis system 140 may be adapted to identify security threats including one or more of the event(s) 131 as well as other events detected by other systems in the network 100. In some embodiments, the security analysis system 140 can be configured to surface security threats to human analysts, and to support the analysts by providing helpful information, e.g., from the event(s) 131 or otherwise, thereby increasing analyst efficiency in conducting investigations.

Figure 2:
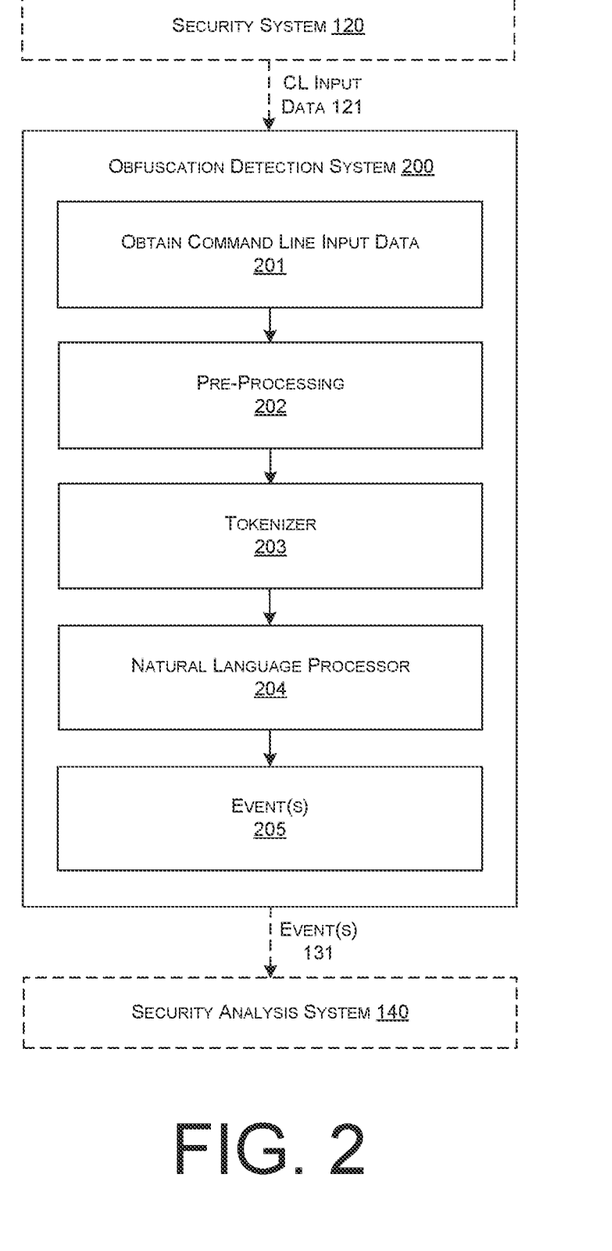
FIG. 2 illustrates example components of an obfuscation detection system, in accordance with various aspects of the technologies disclosed herein.

FIG. 2 illustrates example components of an obfuscation detection system 200, in accordance with various aspects of the technologies disclosed herein. The example obfuscation detection system 200 can implement the obfuscation detection system 130 in some embodiments. For example, the obfuscation detection system 200 can obtain command line input data 121 from the security system 120, and the obfuscation detection system 200 can output event(s) 131 to the security analysis system 140.

The obfuscation detection system 200 illustrated in FIG. 2 comprises a series of elements which can optionally be implemented as a single integrated system, or as separate operations or modules. The elements include obtain command line input data 201, pre-processing 202, tokenizer 203, natural language processor (NLP) 204, and event(s) 205. Example aspects of the pre-processing 202, the tokenizer 203, and the NLP 204 are described further in connection with FIGS. 3, 4 and 5 respectively.

In general, the obfuscation detection system 200 and the elements thereof can be configured for batch processing, or for processing one command line at a time. In a batch processing arrangement, a group of command lines, e.g., command lines in the command line input data 121, can be obtained at obtain command line input data 201. The pre-processing 202, tokenizer 203, and NLP 204 can then each process each command line in the group, optionally before moving on to a next processing stage. For example, the group of command lines can be processed by pre-processing 202, and upon completion of the group, the group of resulting pre-processed command lines can be processed by the tokenizer 203. The tokenizer 203 can generate a token group for each pre-processed command line in the group of pre-processed command lines. Upon completion of tokenizer 203 processing, each of the generated token groups can be processed by the NLP 204, resulting in a group of obfuscation probabilities. Each of the obfuscation probabilities in the group of obfuscation probabilities can finally be compared to a threshold obfuscation probability, and event(s) 205 can be generated for any of the obfuscation probabilities that exceed the threshold obfuscation probability.

In embodiments that process one command line at a time, either a single command line or a group of command lines can be obtained at obtain command line input data 201. The pre-processing 202, tokenizer 203, and NLP 204 can then each process one of the obtained command lines and can pass the resulting output to the next processing stage, before moving on to the processing of a next obtained command line. For example, one command line can be processed by pre-processing 202, and upon completion of the command line, the resulting pre-processed command line can be processed by the tokenizer 203. The tokenizer 203 can generate a token group for the pre-processed command line. Upon completion of tokenizer 203 processing, the generated token group can be processed by the NLP 204, resulting in an obfuscation probability. The obfuscation probability can finally be compared to the threshold obfuscation probability, and an event 205 can be generated when the obfuscation probability exceeds the threshold obfuscation probability. Pre-processing 202 can optionally begin processing a next command line from the obtained command lines prior to completion of the processing by the tokenizer 203 and/or the NLP 204.

Figure 7:
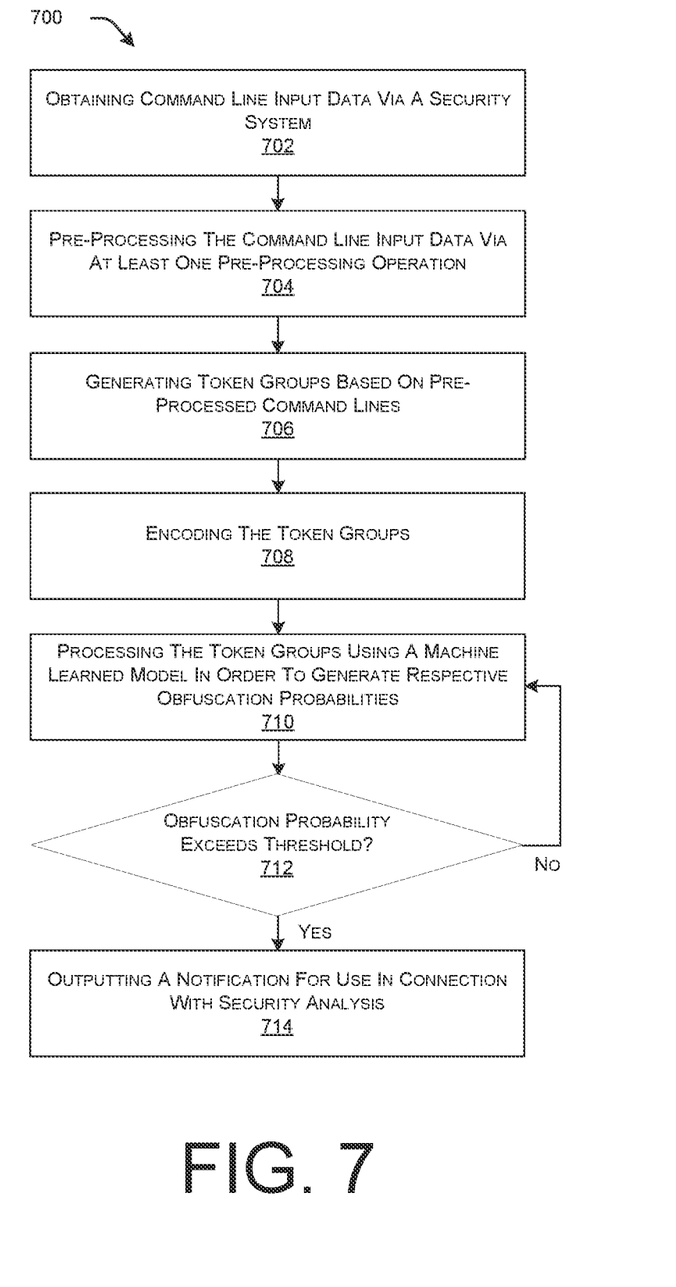
FIG. 7 is a flow diagram that illustrates an example method performed by a computing device in connection with automatic detection of obfuscated command line inputs, in accordance with various aspects of the technologies disclosed herein.

In some embodiments, the operations illustrated in FIG. 2 can be supplemented with an encoding step, to encode token groups that are provided as input to the NLP 204. An example encoding step is illustrated in FIG. 7. Furthermore, in some embodiments, an obfuscation probability classification operation can be included as a separate operation, e.g., after the NLP 204 generates obfuscation probabilities.

Figure 5:
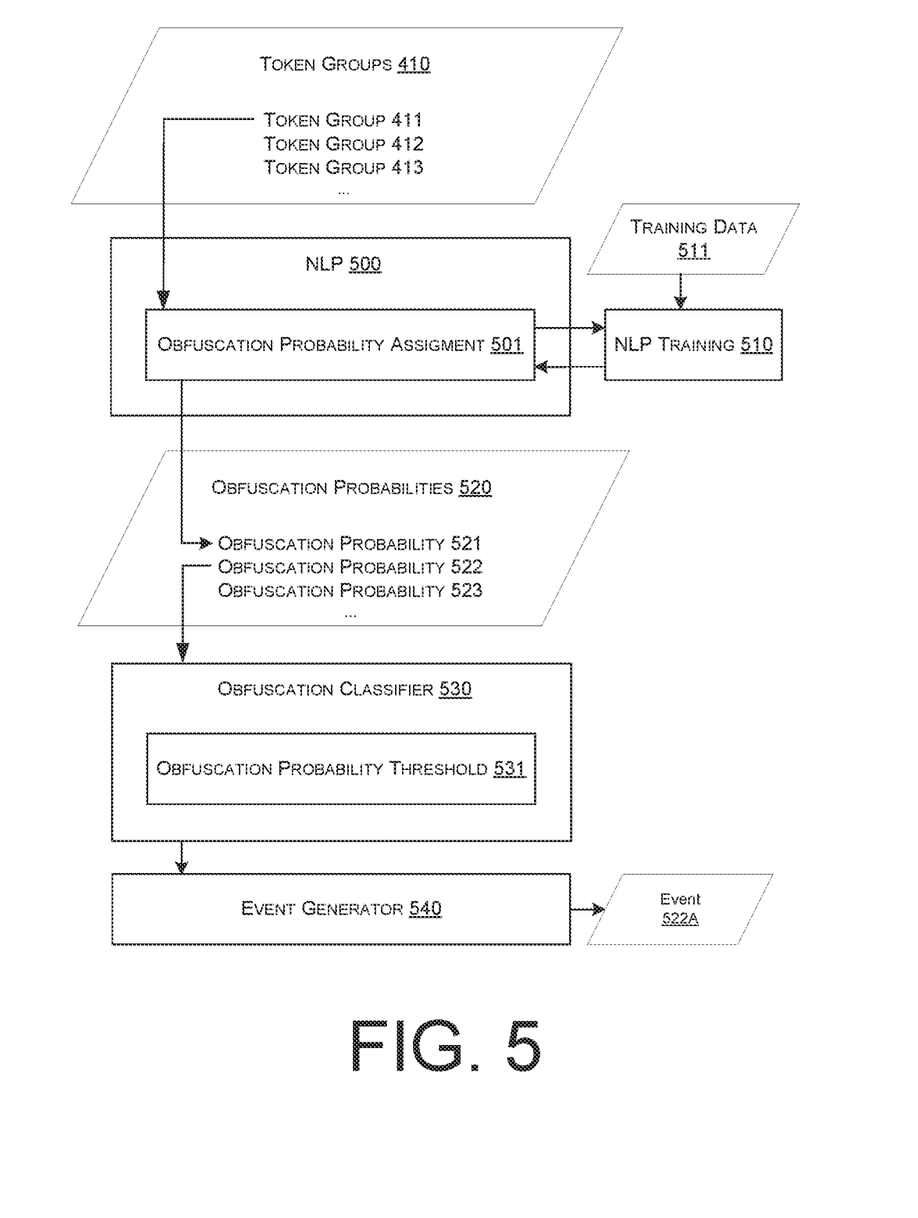
FIG. 5 illustrates an example natural language processor (NLP) component of an obfuscation detection system, in accordance with various aspects of the technologies disclosed herein.

FIG. 5 illustrates an obfuscation classifier that can be adapted to perform obfuscation probability classification in some embodiments.

The operations illustrated in FIG. 2 can begin by obtaining command line input data 121, at obtain command line input data 201. Command lines within the obtained command line input data 121 can be passed to pre-processing 202 for further processing thereof, while data pertaining to conditions or circumstances associated with the command lines, such as user/device identifications, date and time, and other command line circumstance data, can be stored for later use by an event generator, as described with reference to FIG. 5. The operations illustrated in FIG. 2 can end after generating event(s) 205 which can be passed to the security analysis system 140 as event(s) 131. The obfuscation detection system 200 can run in periodic cycles or other intervals as additional command line input data 121 becomes available for processing.

Figure 3:
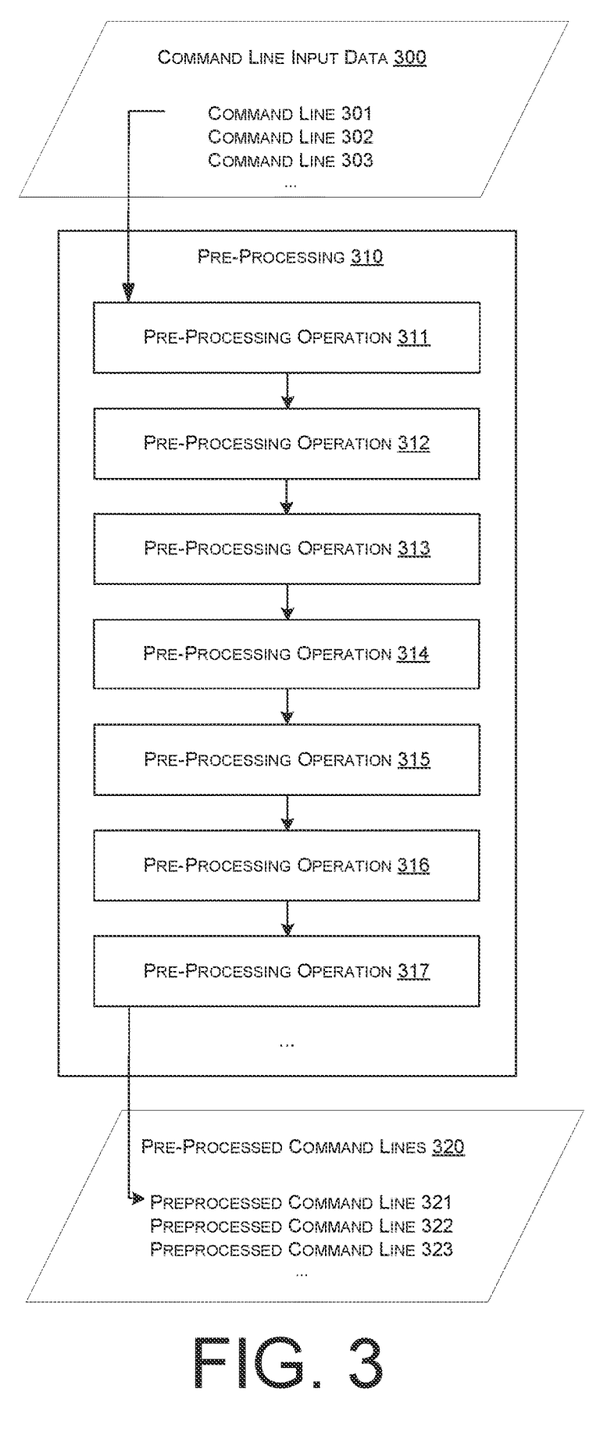
FIG. 3 illustrates an example pre-processing component of an obfuscation detection system, in accordance with various aspects of the technologies disclosed herein.

FIG. 3 illustrates an example pre-processing component of an obfuscation detection system, in accordance with various aspects of the technologies disclosed herein. The illustrated example pre-processing 310 can implement the pre-processing 202 introduced in FIG. 2 in some embodiments. Pre-processing 310 can comprise any number of pre-processing operations, e.g., pre-processing operation 311, pre-processing operation 312, pre-processing operation 313, pre-processing operation 314, pre-processing operation 315, pre-processing operation 316, and pre-processing operation 317. Also illustrated in FIG. 3 are command line input data 300, comprising example command lines 301, 302, 303 . . . and any additional command lines, and pre-processed command lines 320, comprising example pre-processed command lines 321, 322, 322 . . . and any additional pre-processed command lines.

Pre-processing 310 can be initiated by a completion of obtain command line input data 201. The pre-processing 310 can process command line input data 300, which can implement the command line input data 121 introduced in FIG. 1. The pre-processing 310 can be configured to generate pre-processed command lines 320 based on the command line input data 300. Each of the pre-processed command lines 321, 322, 322 is generated based on a command line, e.g., pre-processed command line 321 can be generated based on command line 301, pre-processed command line 322 can be generated based on command line 302, and pre-processed command line 323 can be generated based on command line 303, respectively.

Pre-processing 310 can generally be configured to perform a series of pre-processing operations 311-317 on each command line 301, 302, 303 of the command line input data 300. After the series of pre-processing operations 311-317 is performed on a command line, e.g., on command line 301, pre-processing 310 can output the resulting pre-processed command line, e.g., pre-processed command line 321.

This disclosure includes various example pre-processing operations 311-317 with the understanding that more, fewer, or different pre-processing operations can be used in some embodiments. In general, pre-processing operations 311-317 can comprise any operation that reduces variation inside the command lines 301, 302, 303. For example, the pre-processing operation 311 can comprise, e.g., replacing alphabetical characters within the command line input data with a designated replacement alphabetical character, e.g., the letter "a" or any other selected alphabetical character, while optionally keeping case of the alphabetical characters. The example pre-processing operation 312 can comprise, e.g., replacing numerical characters within command line input data with a designated replacement numerical character, such as a "0" or any other selected numerical character. The example pre-processing operation 313 can comprise, e.g., replacing GUIDs within the command line input data with a designated GUID replacement string, such as "GUID" or any other desired GUID replacement string. The example pre-processing operation 314 can comprise, e.g., replacing dates within the command line input data with a designated date replacement string, such as "DATE" or any other desired date replacement string. The example pre-processing operation 315 can comprise, e.g., replacing IP addresses within the command line input data with a designated IP address replacement string, such as "IP" or any other desired IP address replacement string. The example pre-processing operation 316 can comprise, e.g., replacing decimal numbers within the command line input data with a designated decimal number replacement string, such as "NUMBER" or any other desired number replacement string. The example pre-processing operation 317 can comprise, e.g., replacing URLs within the command line input data with a designated URL replacement string, such as "URL" or any other desired URL replacement string.

The pre-processing operations 311 can optionally be performed in any order and need not necessarily be performed in the order illustrated in FIG. 3. Alternatively, some embodiments can perform at least some of the pre-processing operations 311 in a specified order. For example, in some embodiments, pre-processing operation 315 (IP replacement) can be performed before pre-processing operation 316 (decimal number replacement), as illustrated in FIG. 3, to allow for easier implementation of the pre-processing operation 316. Each pre-processing operation can generate an intermediate output which can be processed by a next pre-processing operation, until the final pre-processing operation outputs a pre-processed command line, such as pre-processed command line 321, which is ready for processing by the tokenizer 203.

In some embodiments, certain tokens can be included by pre-processing 310 in the pre-processed command lines 320. For example, the below example pre-processed command line includes the tokens [NUMBER] [URL] [IP] [DATE]:

A:/Aaaaa/aaaa/aaaaaaa/aaaaaaaaa.aaa[NUMBER][URL][IP][DATE]0000.0000.0000

Meanwhile, other portions of the above example pre-processed command line, namely the "A:/Aaaaa/aaaa/aaaaaaa/aaaaaaaaaaa" and the "0000.0000.0000" have not been tokenized. The tokenizer 203, which is discussed further with reference to FIG. 4, can be configured to keep tokens included in pre-processed command lines, while tokenizing remaining, non-tokenized portions included in the pre-processed command lines. After a completion of pre-processing 310, pre-processing 310 can initiate operations of the tokenizer 203.

Figure 4:
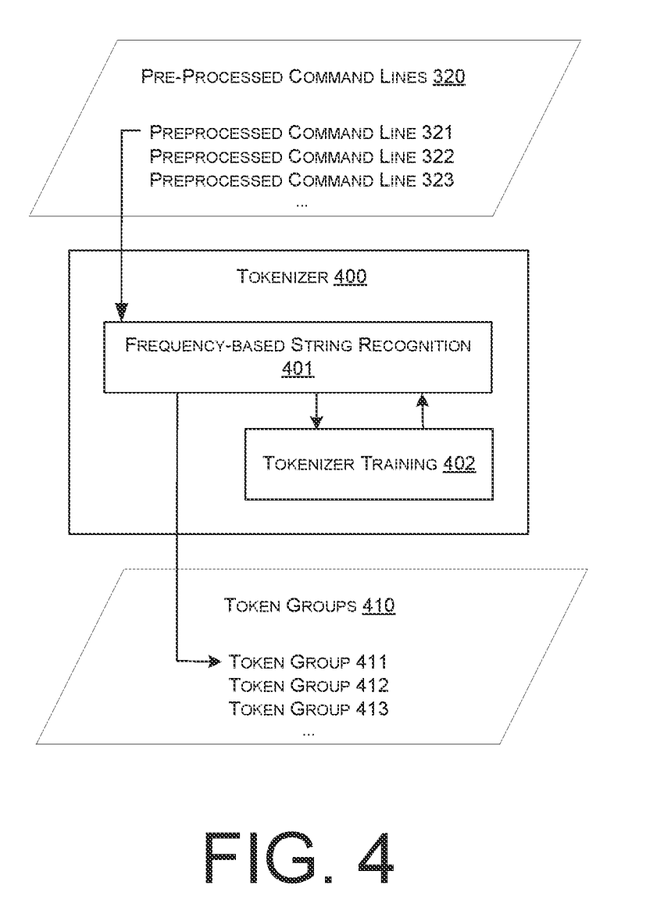
FIG. 4 illustrates an example tokenizer component of an obfuscation detection system, in accordance with various aspects of the technologies disclosed herein.

FIG. 4 illustrates an example tokenizer component of an obfuscation detection system, in accordance with various aspects of the technologies disclosed herein. The illustrated example tokenizer 400 can implement the tokenizer 203 introduced in FIG. 2 in some embodiments. Tokenizer 400 can comprise a frequency-based string recognition element 401, and tokenizer training 402. Also illustrated in FIG. 4 are pre-processed command lines 320, introduced in FIG. 3 and comprising pre-processed command lines 321, 322, 322, ..., as well as token groups 410, comprising example token groups 411, 412, 413, ... and any additional token groups.

Tokenizer 400 can be initiated by a completion of pre-processing 202. The tokenizer 400 can be configured to process the pre-processed command lines 320. The tokenizer 400 can be configured to generate token groups 410 based on the pre-processed command lines 320. Each of the token groups 410 can be generated based on a pre-processed command line, e.g., token group 411 can be generated based on pre-processed command line 321, token group 412 can be generated based on pre-processed command line 322, token group 413 can be generated based on pre-processed command line 323, and so on.

In an embodiment, the frequency-based string recognition element 401 can be configured to identify portions of pre-processed command lines, and the frequency-based string recognition element 401 can convert the portions into tokens. The portions can be identified based on frequency of the portions in multiple pre-processed command lines as can be learned through tokenizer training 402. The tokenizer 400 can also be configured to insert a command line start token and a command line end token in each token group, and to insert additional pad tokens into the token groups as needed in order to generate an identical number of tokens in each token group. Below is an example token group that can be output from a tokenizer 400:

['[CLS]','A',':','/','A','aaaa','/','aaaa','/','aaaaaaa','/', 'aaaaaaaaa','##.aaa',' ', '[NUMBER]',' ','[URL]',' ',' [IP]',' ','[DATE]',' ','[NUMBER]',' ','[NUM-BER]','.', '[NUMBER]','[SEP]','[PAD]','[PAD]',' [PAD]','[PAD]','[PAD]','[PAD]']

In the above example, the tokenizer 400 has inserted the command line start token [CLS] at the beginning of the token group, the tokenizer 400 has inserted the command line end token [SEP] at the end of the token group, and the tokenizer 400 has inserted six pad tokens to achieve a desired total number of tokens in the token group. Furthermore, the tokenizer 400 has determined to tokenize "A:/Aaaaa/aaaa/aaaaaaa/aaaaaaaaaaaa" as 'A', ':', '/', 'A', 'aaaa', '/', 'aaaa', '/', 'aaaaaaa', '/', 'aaaaaaaaa', '.aaa', based on the training of the frequency-based string recognition element 401. The tokenizer 400 has also determined to tokenize "0000.0000.0000" as '[NUMBER]', '.', '[NUMBER]', '.', '[NUMBER]', based on the training of the frequency-based string recognition element 401. The tokenizer 400 has kept pre-existing tokens, e.g., in the '[NUMBER]', ' ', '[URL]', ' ', '[IP]', ' ', '[DATE]' section of the token group.

In some embodiments, tokens can further include a data element, such as a #symbol, to indicate that a token is a continuation of a previous token. Furthermore, in some embodiments, the tokenizer 400 and/or a separate encoding element can be configured to encode token groups for processing by the NLP 204. After a completion of tokenizer 400, tokenizer 400 can initiate operations of the NLP 204.

FIG. 5 illustrates an example natural language processor (NLP) component of an obfuscation detection system, in accordance with various aspects of the technologies disclosed herein. The illustrated example NLP 500 can implement the NLP 204 introduced in FIG. 2 in some embodiments. NLP 500 can comprise obfuscation probability assignment 501, which can be trained using NLP training 510 and training data 511. Also illustrated in FIG. 5 are the token groups 410 introduced in FIG. 4 and comprising example token groups 411, 412, 413, . . . , as well as obfuscation probabilities 520, comprising obfuscation probabilities 521, 522, 523, . . . , and any additional obfuscation probabilities. FIG. 5 further includes an example obfuscation classifier 530, an example event generator 540, and an example event 522A. The obfuscation classifier 530 comprises an example obfuscation probability threshold 531.

NLP 500 can be initiated by a completion of tokenizer 203. The NLP 500 can be configured to process the token groups 410. The NLP 500 can be configured to generate obfuscation probabilities 520 based on the token groups 410. Each of the obfuscation probabilities 520 can be generated based on a token group, e.g., obfuscation probability 521 can be generated based on token group 411, obfuscation probability 522 can be generated based on token group 412, obfuscation probability 523 can be generated based on token group 413, and so on.

Initially, the obfuscation probability assignment 501 can be trained by NLP training 510 using training data 511. The obfuscation probability assignment 501 can be trained to identify obfuscation probabilities corresponding to different token groups. After obfuscation probability assignment 501 is deployed to NLP 500, obfuscation probability assignment 501 can optionally supply information back to NLP training 510, for further training and refinement of the obfuscation probability assignment 501. Obfuscation probability assignment 501 can be configured to output a determined obfuscation probability, e.g., obfuscation probability 521, 522, 523, . . . for each token group 411, 412, 413, The obfuscation probabilities can be in the form of a percentage value, such as 1%, 2%, 3%, . . . , 99%, 100%, etc.

After a completion of the NLP 500, NLP 500 can initiate operations of the obfuscation classifier 530. The obfuscation classifier 530 can be configured to compare each of the obfuscation probabilities 521, 522, 523, . . . , to an obfuscation probability threshold 531. The obfuscation probability threshold 531 can comprise any threshold value, e.g., 75%, 76%, 77%, . . . 99%, 100%. When an obfuscation probability, e.g., obfuscation probability 522, meets or exceeds the obfuscation probability threshold 531, the obfuscation classifier 530 can trigger the event generator 540 to generate an event, e.g., event 522A. When an obfuscation probability does not meet or exceed the obfuscation probability threshold 531, the obfuscation classifier 530 need not trigger the event generator 540 to generate an event.

The event generator 540 can be configured to identify, for an obfuscation probability 522 that exceeds the obfuscation probability threshold 531, an associated command line (associated obfuscation probability 522) and data pertaining to conditions or circumstances associated with the command line, such as the user/device identification, date and time, and other command line circumstance data. The event generator 540 can then include any desired command line and command line circumstance data in an event 522A, and the event generator 540 can output the event 522A for example by sending the event 522A to a security analysis system 140.

Figure 6:
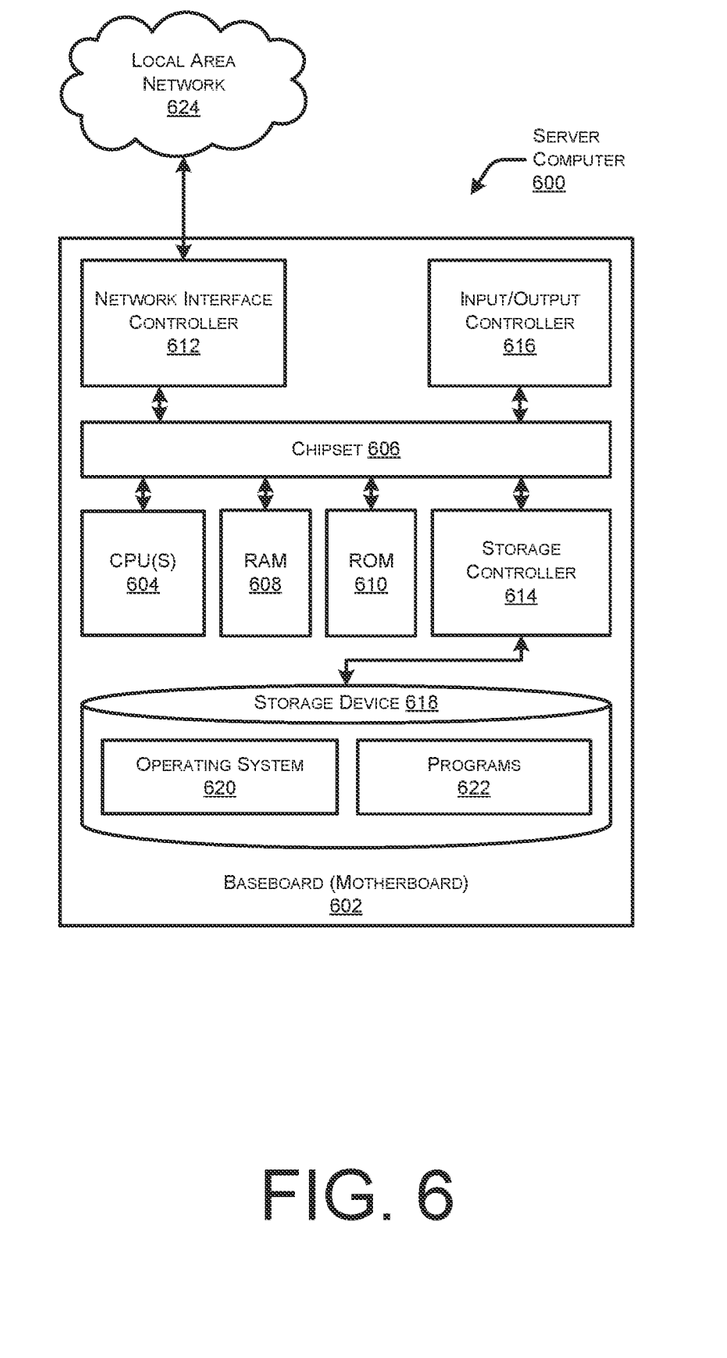
FIG. 6 illustrates an example computer hardware architecture that can implement the techniques disclosed herein, in accordance with various aspects of the technologies disclosed herein.

FIG. 6 illustrates an example computer hardware architecture that can implement the techniques disclosed herein, in accordance with various aspects of the technologies disclosed herein. The computer architecture shown in FIG. 6 illustrates a conventional server computer 600, however the computer architecture can optionally implement any other computing devices such as a workstation, desktop computer, laptop, tablet, network appliance, e-reader, smartphone, or other computing device. The illustrated computer architecture can be utilized to execute any of the software components presented herein.

The server computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the server computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the server computer 600. The chipset 606 can further provide an interface to a computer-readable storage medium such as a read-only memory ("ROM") 610 or non-volatile RAM ("NVRAM") for storing basic routines that help to startup the server computer 600 and to transfer information between the various components and devices. The ROM 610 or NVRAM can also store other software components necessary for the operation of the server computer 600 in accordance with the configurations described herein.

The server computer 600 can operate in a networked environment using logical connections to remote computing devices and computer systems through a network, such as the LAN 624. The chipset 606 can include functionality for providing network connectivity through a NIC 612, such as a gigabit Ethernet adapter. The NIC 612 is capable of connecting the server computer 600 to other computing devices over the LAN 624. It should be appreciated that multiple NICs 612 can be present in the server computer 600, connecting the computer to other types of networks and remote computer systems.

The server computer 600 can be connected to a storage device 618 that provides non-volatile storage for the server computer 600. The storage device 618 can store an operating system 620, programs 622, and data, to implement any of the various components described in detail herein. The storage device 618 can be connected to the server computer 600 through a storage controller 614 connected to the chipset 606. The storage device 618 can comprise one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the server computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 600 can further read information from the storage device 618 by detecting the physical states or characteristics of one or more particular locations within the physical storage units.

In addition to the mass storage device 618 described above, the server computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the server computer 600. In some examples, the operations performed by the computing elements illustrated in FIGS. 1-5, and or any components included therein, may be supported by one or more devices similar to server computer 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the server computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the server computer 600.

In one embodiment, the storage device 618 or other computer-readable storage media is encoded with computer-executable instructions which, when loaded into the server computer 600, transform the computer from a general-purpose computing system into a special-purpose computer capable of implementing the embodiments described herein. These computer-executable instructions transform the server computer 600 by specifying how the CPUs 604 transition between states, as described above. According to one embodiment, the server computer 600 has access to computer-readable storage media storing computer-executable instructions which, when executed by the server computer 600, perform the various processes described with regard to FIG. 7. The server computer 600 can also include computer-readable storage media having instructions stored thereupon for performing any of the other computer-implemented operations described herein.

The server computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the server computer 600 might not include all of the components shown in FIG. 6, can include other components that are not explicitly shown in FIG. 6, or might utilize an architecture completely different than that shown in FIG. 6.

FIG. 7 is a flow diagram of an example method 700 performed at least partly by a computing device, such as the server computer 600. The logical operations described herein with respect to FIG. 7 may be implemented (1) as a sequence of computer-implemented acts or program modules running on a computing system and/or (2) as interconnected machine logic circuits or circuit modules within the computing system. In some examples, the method 700 may be performed by a system comprising one or more processors and one or more non-transitory computer-readable media storing computer-executable instructions that, when executed by the one or more processors, cause the one or more processors to perform the methods 700.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 7 is a flow diagram that illustrates an example method performed by a computing device in connection with automatic detection of obfuscated command line inputs, in accordance with various aspects of the technologies disclosed herein. At operation 702, the server computer 600 can obtain command line input data, e.g., command line input data 121, via a security system 120. The command line input data 121 can comprise command lines used at multiple computing devices 111-114 in a computing network 100 and logged by the security system 120.

Operation 704 comprises pre-processing the command line input data 121 via at least one pre-processing operation. For example, with reference to FIG. 3, the command line input data 300 can be pre-processed by any or all of the pre-processing operations 311-316. The at least one pre-processing operation can generally reduce variation inside the command lines.

As described with reference to FIG. 3, example pre-processing operations include: replacing numerical characters within the command line input data 300 with a designated replacement numerical character: replacing GUIDs within the command line input data 300 with a designated GUID replacement string: replacing dates within the command line input data 300 with a designated date replacement string: replacing decimal numbers within the command line input data 300 with a designated decimal number replacement string; replacing IP addresses within the command line input data 300 with a designated IP address replacement string: or replacing URLs within the command line input data 300 with a designated URL replacement string. The pre-processing at operation 704 can result in pre-processed command lines 320.

Operation 706 comprises generating token groups based on the pre-processed command lines. Fore example, with reference to FIG. 4, the tokenizer 400 can generate token groups 410 based on the pre-processed command lines 320. Each token group 411, 412, 413 of the token groups 410 can represent a pre-processed command line of the pre-processed command lines 320. For example, the token group 411 of the token groups 410 can represent the pre-processed command line 321 of the pre-processed command lines 320. Furthermore, each token in a token group 411, 412, 413 can represent a portion of a pre-processed command line.

In some embodiments, generating the token groups 411, 412, 413 at 706 can be performed by identifying portions of the pre-processed command lines 321, 322, 323, and converting the portions into tokens. The portions can be identified based on frequency of the portions in pre-processed command lines 320. Furthermore, generating the token groups 411, 412, 413 can comprise generating a command line start token and a command line end token for each token group 411, 412, 413 of the token groups 410. Generating the token groups 411, 412, 413 can also optionally comprise inserting one or more additional pad tokens into one or more of the token groups 411, 412, 413 in order to generate an identical number of tokens in each of the token groups 411, 412, 413. Generating the token groups can be accomplished in some embodiments by a tokenizer comprising a trained machine learning model.

Operation 708 comprises encoding the token groups. For example, a one-hot encoding approach can optionally be applied to each of the token groups 411, 412, 413 to encode the token groups 411, 412, 413. Other encoding techniques can be applied in other embodiments.

Operation 710 comprises processing the token groups 411, 412, 413 using a machine learned model in order to generate respective obfuscation probabilities 521, 522, 523. The respective obfuscation probabilities 521, 522, 523 can comprise an obfuscation probability for each respective token group 411, 412, 413 of the token groups 410. For example, the respective obfuscation probability 521 corresponds to respective token group 411, the respective obfuscation probability 522 corresponds to respective token group 412, and so on.

The machine learned model applied at operation 710 can be configured as a large language model. In some embodiments, the machine learned model can comprise an NLP model. For example, the machine learned model can comprise an Electra type machine learned model.

Operation 712 comprises determining, for each obfuscation probability, whether the obfuscation probability exceeds a threshold probability. If yes, then the process can proceed to 714. If no, then the process can evaluate a next obfuscation probability output from operation 710, as represented by the return arrow to operation 710.

At 714, in response to a respective obfuscation probability exceeding the threshold obfuscation probability at 712, the server computer 600 can output a notification for use in connection with security analysis of the computing network 100. The notification can comprise, e.g., the command line associated with the obfuscation probability and all associated data, e.g., the device, the time, the user, and the process involved in executing the command line.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for automatic detection of obfuscated command line inputs, comprising:

obtaining command line input data via a security system, the command line input data comprising command lines used at multiple computing devices in a computing network and logged by the security system;

pre-processing the command line input data via at least one pre-processing operation, wherein the at least one pre-processing operation reduces variation inside the command lines, and wherein the pre-processing results in pre-processed command lines;

generating token groups based on the pre-processed command lines, wherein each token group of the token groups represents a pre-processed command line of the pre-processed command lines, and wherein each token in a token group represents a portion of a pre-processed command line;

processing the token groups using a machine learned model, wherein the machine learned model is configured as a large language model, and wherein the machine learned model generates a respective obfuscation probability for each respective token group of the token groups; and in response to a respective obfuscation probability exceeding a threshold obfuscation probability, outputting a notification for use in connection with security analysis of the computing network.

2. The method of claim 1, wherein the at least one pre-processing operation comprises one or more of:

replacing alphabetical characters within the command line input data with a designated replacement alphabetical character, while keeping case of the alphabetical characters;

replacing numerical characters within the command line input data with a designated replacement numerical character;

replacing globally unique identifiers (GUIDs) within the command line input data with a designated GUID replacement string;

replacing dates within the command line input data with a designated date replacement string;

replacing decimal numbers within the command line input data with a designated decimal number replacement string;

replacing internet protocol (IP) addresses within the command line input data with a designated IP address replacement string; or replacing uniform resource locators (URLs) within the command line input data with a designated URL replacement string.

3. The method of claim 1, wherein generating the token groups is performed by identifying portions of the pre-processed command lines and converting the portions into tokens, and wherein the portions are identified based on frequency of the portions in pre-processed command lines.

4. The method of claim 1, wherein generating the token groups comprises applying a tokenizer comprising a trained machine learning model.

5. The method of claim 1, wherein generating the token groups comprises generating a command line start token and a command line end token for each token group of the token groups.

6. The method of claim 1, further comprising inserting one or more additional pad tokens into one or more of the token groups in order to generate an identical number of tokens in each of the token groups.

7. The method of claim 1, further comprising performing one-hot encoding to encode the token groups.

8. The method of claim 1, wherein the machine learned model comprises is configured as a natural language processor (NLP) type machine learned model.

9. A device comprising:
one or more processors;
one or more computer-readable media storing computer-executable instructions that, when executed by the one or more processors, cause the one or more processors to perform operations comprising:
obtaining command line input data via a security system, the command line input data comprising command lines used at multiple computing devices in a computing network and logged by the security system;
pre-processing the command line input data via at least one pre-processing operation, wherein the at least one pre-processing operation reduces variation inside the command lines, and wherein the pre-processing results in pre-processed command lines;
generating token groups based on the pre-processed command lines, wherein each token group of the token groups represents a pre-processed command line of the pre-processed command lines, and wherein each token in a token group represents a portion of a pre-processed command line;
processing the token groups using a machine learned model, wherein the machine learned model is configured as a large language model, and wherein the machine learned model generates a respective obfuscation probability for each respective token group of the token groups; and
in response to a respective obfuscation probability exceeding a threshold obfuscation probability, outputting a notification for use in connection with security analysis of the computing network.

10. The device of claim 9, wherein the at least one pre-processing operation comprises one or more of:
replacing alphabetical characters within the command line input data with a designated replacement alphabetical character, while keeping case of the alphabetical characters;
replacing numerical characters within the command line input data with a designated replacement numerical character;
replacing globally unique identifiers (GUIDs) within the command line input data with a designated GUID replacement string;
replacing dates within the command line input data with a designated date replacement string;
replacing decimal numbers within the command line input data with a designated decimal number replacement string;
replacing internet protocol (IP) addresses within the command line input data with a designated IP address replacement string; or
replacing uniform resource locators (URLs) within the command line input data with a designated URL replacement string.

11. The device of claim 9, wherein generating the token groups is performed by identifying portions of the pre-processed command lines and converting the portions into tokens, and wherein the portions are identified based on frequency of the portions in pre-processed command lines.

12. The device of claim 9, wherein generating the token groups comprises applying a tokenizer comprising a trained machine learning model.

13. The device of claim 9, wherein generating the token groups comprises generating a command line start token and a command line end token for each token group of the token groups.

14. The device of claim 9, wherein the operations further comprise inserting one or more additional pad tokens into one or more of the token groups in order to generate an identical number of tokens in each of the token groups.

15. The device of claim 9, further comprising performing one-hot encoding to encode the token groups.

16. The device of claim 9, wherein the machine learned model comprises is configured as a natural language processor (NLP) type machine learned model.

17. A method comprising:
pre-processing command line input data via at least one pre-processing operation, wherein the pre-processing is applied to command lines in the command line input data and results in pre-processed command lines;
generating token groups based on the pre-processed command lines, wherein each token group of the token groups represents a pre-processed command line of the pre-processed command lines;
processing the token groups using a machine learned model, wherein the machine learned model generates obfuscation probabilities for the token groups;
comparing the obfuscation probabilities to a threshold obfuscation probability to classify command lines associated with the obfuscation probabilities as either obfuscated or not obfuscated; and
outputting, for command lines associated with an obfuscation probabilities classified as obfuscated, notifications for use in connection with security analysis.

18. The method of claim 17, further comprising receiving the command line input data via an endpoint security system, the command line input data comprising command lines used at multiple endpoint computing devices in a computing network and logged by the security system.

19. The method of claim 17, wherein the at least one pre-processing operation reduces variation inside the command lines.

20. The method of claim 17, wherein the machine learned model is configured as a natural language processor adapted to use a large language model.

* * * * *